US012467300B2

(12) United States Patent
Vonaesch

(10) Patent No.: US 12,467,300 B2
(45) Date of Patent: Nov. 11, 2025

(54) SLIDING DOOR SYSTEM FOR INSTALLATION IN A BUILDING WALL

(71) Applicant: Inventio AG, Hergiswil (CH)

(72) Inventor: Jonas Vonaesch, Lucerne (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/560,114

(22) PCT Filed: May 4, 2022

(86) PCT No.: PCT/EP2022/061940
§ 371 (c)(1),
(2) Date: Nov. 10, 2023

(87) PCT Pub. No.: WO2022/243039
PCT Pub. Date: Nov. 24, 2022

(65) Prior Publication Data
US 2024/0229531 A1 Jul. 11, 2024

(30) Foreign Application Priority Data
May 17, 2021 (EP) .................................... 21173993

(51) Int. Cl.
*E05D 15/58* (2006.01)
*E05D 15/10* (2006.01)

(52) U.S. Cl.
CPC ......... *E05D 15/58* (2013.01); *E05D 15/1005* (2013.01); *E05Y 2201/64* (2013.01); *E05Y 2201/71* (2013.01); *E05Y 2900/132* (2013.01)

(58) Field of Classification Search
CPC ............ E05D 15/58; E05D 2015/1031; E05D 15/1042; E05D 15/1005; E05D 15/1007;
(Continued)

(56) References Cited

U.S. PATENT DOCUMENTS 3,386,205 A * 6/1968 Herr ........................ E05B 83/02 49/276
5,921,613 A * 7/1999 Breunig ..................... B60J 5/06 296/146.12
(Continued)

FOREIGN PATENT DOCUMENTS

AT 507815 A1 * 8/2010 ............. E05B 63/20
CA 2739737 A1 * 11/2012 ......... E05D 15/1065
(Continued)

*Primary Examiner* — Daniel P Cahn
*Assistant Examiner* — Patrick B. Ponciano
(74) *Attorney, Agent, or Firm* — Shumaker, Loop & Kendrick, LLP

(57) ABSTRACT

A sliding door system for a building wall includes first and second wall parts having opposite first and second door openings respectively and separated by an intermediate space, first and second door leaves closing the first and second door openings respectively, a door leaf carrier slidable along the intermediate space by a linear guide device and on which the door leaves are pivotably mounted by a pivot mechanism, and a coupling device converting the carrier sliding movement into a rotational movement actuating the pivot mechanism so that the door leaves pivot relative to the door leaf carrier, the coupling device including a slotted component with a slot representing a desired relationship between the sliding movement and the rotational movement and a control lever coupling the slot to the pivot mechanism, and wherein the slotted component is mounted on at least one of the first and second wall parts.

11 Claims, 4 Drawing Sheets

(58) Field of Classification Search
CPC . E05D 15/101; E05D 15/1013; E05D 15/581; E05D 2015/585; E05Y 2201/64; E05Y 2900/14; E05Y 2201/71; E05Y 2900/132; E06B 3/4654; E06B 3/4645; E05F 2017/005
USPC ............................................ 49/213, 216–218
See application file for complete search history.

(56) References Cited

U.S. PATENT DOCUMENTS

| | | | | |
|---|---|---|---|---|
| 6,336,246 | B1 * | 1/2002 | Giovannetti | E06B 3/4672 49/128 |
| 10,501,974 | B2 * | 12/2019 | Issler | E05D 15/1015 |
| 12,320,174 | B2 * | 6/2025 | Vonaesch | E05D 15/10 |
| 2006/0032140 | A1 * | 2/2006 | Arimoto | E05F 15/646 49/413 |
| 2013/0020918 | A1 * | 1/2013 | Mascheroni | E05D 15/1042 312/319.1 |
| 2024/0229530 | A1 * | 7/2024 | Vonaesch | E06B 3/5454 |
| 2024/0240498 | A1 * | 7/2024 | Vonaesch | E05B 47/0603 |

FOREIGN PATENT DOCUMENTS

| | | | | |
|---|---|---|---|---|
| DE | 19735181 | C2 * | 11/2001 | B60J 5/062 |
| DE | 10163061 | A1 | 6/2003 | |
| DE | 10163061 | B4 | 6/2003 | |
| DE | 102019211796 | A1 * | 2/2021 | E05D 15/10 |
| EP | 1731703 | A2 | 12/2006 | |
| EP | 2871316 | A1 | 5/2015 | |
| EP | 2876241 | A1 | 5/2015 | |
| ES | 2662701 | B1 | 4/2018 | |
| FR | 3095616 | A1 * | 11/2020 | E05D 15/1007 |
| SE | 0291564 | A1 * | 8/1987 | E05D 15/10 |
| WO | WO-2012007417 | A1 * | 1/2012 | B61D 19/005 |
| WO | WO-2017144193 | A1 * | 8/2017 | E05D 15/1015 |
| WO | 2018065653 | A1 | 4/2018 | |
| WO | 2020182513 | A1 | 9/2020 | |
| WO | WO-2024132753 | A1 * | 6/2024 | E05B 65/08 |

* cited by examiner

SLIDING DOOR SYSTEM FOR INSTALLATION IN A BUILDING WALL

FIELD

The present invention relates to a sliding door system for installation in a building wall.

BACKGROUND

A sliding door can comprise two door leaves arranged opposite one another, which can be pivotably mounted on a horizontally slidable door leaf carrier and can be pivoted by means of a pivot mechanism into corresponding door openings of a building wall when the door leaf carrier is slid—for example, by means of an electric drive. Such a sliding door can be referred to as a wallpaper door. The opening and closing of the sliding door should take place as quickly as possible for safety reasons and also for practical reasons. At the same time, it should be ensured that the forces occurring in this case not become excessive, with a view to a design that is as long-lasting and cost-efficient as possible or for reasons of comfort. Not least, aesthetic aspects can play an important role. For example, the mechanism of the sliding door in the installed state should as far as possible not be visible from the outside and nevertheless be easily accessible for repair and maintenance purposes.

Examples of such a sliding door are shown in AT 507 815 A1 and DE 101 63 061 A1.

SUMMARY

There may therefore be a need for a sliding door system for installation in a building wall, by means of which a sliding door can be quickly opened and closed, manufactured cost-efficiently, and/or easily maintained.

This need can be met by the subject matter of the advantageous embodiments that are defined in the following description.

The invention relates to a sliding door system for installation in a building wall. The sliding door system comprises a first wall part with a first door opening and a second wall part with a second door opening. The first wall part and the second wall part are arranged opposite one another so that the first door opening is opposite the second door opening, and the first wall part is separated from the second wall part by an intermediate space. The sliding door system further comprises a first door leaf for closing the first door opening, a second door leaf for closing the second door opening, a door leaf carrier, which is slidable along the intermediate space by means of a linear guide device and on which the first door leaf and the second door leaf are pivotably mounted by means of a pivot mechanism, and a coupling device for transferring a sliding movement of the door leaf carrier into a rotational movement for actuating the pivot mechanism, so that the first door leaf and the second door leaf are pivoted relative to the door leaf carrier. For this purpose, the coupling device comprises a slotted component with a slot that represents a desired relationship between the sliding movement and the rotational movement, and a control lever for coupling the slot to the pivot mechanism. The slotted component is mounted on the first wall part and/or on the second wall part.

The first and second wall parts can be parts of a housing of the sliding door system which is suitable for installation in the building wall, and more precisely in a corresponding recess in the building wall. The slotted component can be mounted on and/or in the housing via the first and/or second wall parts. For example, the first and/or second wall parts can form a side wall, a floor, and/or a ceiling of the housing, wherein the slotted component can be mounted on the side wall, the floor, and/or the ceiling.

The term, "door leaf," can be understood to mean a flat, e.g., plate-shaped, element, which can also be referred to as a door panel.

The door leaf carrier can be understood to be, for example, a single slidable carrier or a slidable composite of several individual carriers—for example, in the form of a carrier frame. In the installed state of the sliding door system, the door leaf carrier can be arranged at least partially in the intermediate space between the first and second wall parts. However, it is also possible for the door leaf carrier to be arranged at least partially above and/or below the intermediate space.

In addition, the sliding door system can comprise an electric drive for sliding the door leaf carrier along the intermediate space.

The linear guide device can comprise one or more guide rails into which the door leaf carrier can be slidably mounted—for example, by means of rollers and/or sliding elements. In the installed state of the sliding door system, the door leaf carrier can be slidable in a horizontal sliding direction by means of the linear guide device.

The pivot mechanism can be designed, for example, to pivot the first and second door leaves in opposite directions relative to the door leaf carrier. The respective pivoting movements of the first and second door leaves can be coordinated with one another by means of the pivot mechanism—for example, in such a way that the two door openings are closed and/or opened again by the respective door leaf as simultaneously as possible.

The slot can be realized, for example, in the form of a groove or a recess in the slotted component. The slot can comprise a defined course with one or more straight and/or curved slot sections. The control lever can have, for example, at one of its ends a guide pin which is mounted in the slot and can be slid along the slot.

In other words, the first and second door leaves can be controlled in their pivoting movement by the same slot and the same control lever. The slot can be the only slot for controlling the pivoting movement of the first and second door leaves.

The slotted component can be fixedly connected to the first and/or second wall parts—for example, screwed or clamped thereto. The slotted component can be arranged partially or completely outside the door leaf carrier. For example, the slotted component can be arranged in a region of the intermediate space that is not visible from the outside, such as above the first and/or second door openings and/or above the first and/or second door leaves. The slotted component can be mounted on an inner side, facing the intermediate space, of the first and/or second wall parts. However, other installation locations of the slotted component are also possible.

It is possible for the slotted component to be mounted on the first and/or second wall parts via an adjustment device, wherein the adjustment device enables a readjustment of a horizontal and/or vertical position of the slotted component after its mounting.

By such a mounting of the slotted component outside the door leaf carrier, the manufacturing costs of the sliding door system can be reduced compared to conventional solutions with the slotted controller integrated into the door leaf carrier. In addition, simple replacement of the sliding door system makes it possible to easily adapt the sliding door system to different installation locations, independently of the door leaf carrier. Another advantage is that the slotted component can be designed to be significantly larger and correspondingly more robust than when mounted on or in the door leaf carrier.

The geometry of the slot, and in particular its course in the longitudinal direction, can be selected, for example, as a function of at least one of the following parameters:

mass and dimensions of the door leaves, diameter of a possible guide pin for guiding the control lever in the slot, desired profile of a respective movement curve of the door leaves, length of the control lever, angle between the control lever and any pivot levers, via which the door leaves are mounted on the door leaf carrier.

Possible features and advantages of embodiments of the invention can be regarded, inter alia and without limiting the invention, as being based upon the concepts and findings described below.

According to one embodiment, for guiding the control lever, the slot can comprise a straight first slot section, a straight second slot section, and a curved third slot section. In this case, the third slot section can be arranged between the first slot section and the second slot section and/or merge into the first slot section and the second slot section. An optimized movement path of the two door leaves can thus be implemented with little structural effort. The movement path can, for example, be optimized such that acceleration forces generated during opening or closing are minimized, and/or externally visible abrasion tracks on the two door leaves are prevented.

According to one embodiment, the first slot section and the second slot section can be oriented obliquely to one another. This can be understood in such a way that the first and second slot sections enclose an angle that considerably deviates from 90 degrees—for example, by at least 5 degrees or by at least 10 degrees. The first and second slot sections can be oriented obliquely to one another in one or more spatial planes. For example, the first and second slot sections can in this respect be oriented as obliquely to one another as their respective longitudinal axes are oriented obliquely to one another. This has the technical effect that different rotational movements for actuating the pivot mechanism can be generated by the first slot section and the second slot section.

According to one embodiment, the slotted component can be mounted on the first wall part and/or on the second wall part such that the first slot section in the installed state of the sliding door system extends parallel to a sliding direction of the door leaf carrier. For example, it can be thereby achieved that an orientation of the control lever relative to the sliding direction is essentially constant, i.e., the door leaves are only slid, but are not pivoted back to or away from the door leaf carrier at the same time as long as the control lever is being guided in the first slot section.

According to one embodiment, a geometry of the slot can be selected such that the first door leaf and the second door leaf in each case follow a straight first track section when the door leaf carrier is slid between an initial position, in which the first door opening and the second door opening are unlocked, and a first intermediate position, follow a curved second track section when the door leaf carrier is slid between the first intermediate position and a second intermediate position in which the first door leaf of the first door opening is opposite the second door leaf of the second door opening, follow a straight third track section, which is orthogonal to the first track section, when the door leaf carrier is slid between the second intermediate position and an end position in which the first door leaf closes the first door opening, and the second door leaf closes the second door opening.

The first intermediate position and the second intermediate position can each lie in the sliding direction between the starting position and the end position. The first intermediate position can lie between the second intermediate position and the starting position.

This embodiment enables rapid opening and/or closing of the first and second door openings. In this context, "rapid" can be understood to mean, for example, a duration of 3 seconds or less. In addition, forces which act upon components of the sliding door system and/or the building wall during opening and/or closing can be significantly reduced in comparison with other possible movement paths of the two door leaves, which leads to lower production and maintenance costs. In other words, the two door leaves can thus be moved smoothly or at least approximately smoothly.

According to one embodiment, the second track section can be at least partially clothoid-shaped. However, other curve shapes are also possible which enable a minimization of jerking—for example, a C2 curvature. In other words, the second track section can have a shape that approximates a clothoid in one or more parts or also overall. For example, the curved track section can comprise a clothoid-shaped first part into which the first track section transitions, and/or a clothoid-shaped second part into which the second track section transitions. The first and second parts can either merge directly into one another or be connected to one another via a third part of the second track section. The third part can be clothoid-shaped or even non-clothoid-shaped—for example, circular-arc-shaped.

According to one embodiment, for switching between a first geometry and a second geometry of the slot, the coupling device can comprise a switching mechanism, which can be actuated by means of the control lever as a function of a sliding direction of the door leaf carrier. The switching mechanism can be actuated, for example, during each change between a closing and opening operation.

In other words, the coupling device can be designed such that a respective track which the door leaves follow when the door leaf carrier is slid depends upon whether the door leaves are moved towards or away from the door openings. By means of different tracks during opening and closing, it can be brought about, for example, that the door openings are closed more quickly than opened, or vice versa.

For example, the slotted component, and thus the slot, can be mounted on the first and/or second wall parts slidably between a first—preferably upper—position and a second—preferably lower—position, wherein the slot in the first position has a different geometry from that in the second position. In this case, the switching between the first geometry and the second geometry is thus brought about by a simple displacement of the slotted component. The displacement can be brought about by means of the control lever and, in addition, by means of a spring mechanism.

The track for opening the door and the track for closing the door are thus located on different levels in the slot. At the end of closing, the control lever presses onto an oblique surface and thereby presses the slot upwards or downwards to another level, so that, during the subsequent opening of the control lever, the track for opening the door moves away. At the end of the opening, the slot is slid back to the original level, so that, during the subsequent closing of the control lever, the track for closing moves away. This return sliding can in turn take place by means of an oblique surface or by means of the spring mechanism. In order to not slide the slot during opening when the spring mechanism is being used, the control lever can engage in a track limit which prevents the slot from sliding back as long as opening continues. Towards the end of the opening, the track limit ends, and the spring mechanism can slide the slot back. Additionally or alternatively, a bi-stable holding element can also be provided, which holds the slot on the respective upper or lower level.

Alternatively, the spring mechanism can be tensioned even during the closing of the door and be held by the track limit. The spring mechanism will then be less tensioned during the opening of the door.

Alternatively, the control lever can be designed such that it can be slid to a higher and a lower level, and the slot can be designed such that it is fixed, i.e., not slidable. In this case, at the end of opening or closing, the control lever is slid to the respective other, upper or lower, level by an oblique surface or a spring.

In this case, the control lever can be guided into the same slot in both positions of the slotted component.

It is also possible for the slotted component to comprise a first slot having the first geometry and a second slot having the second geometry. In this case, the switching mechanism can be designed to couple the control lever either to the first slot or to the second slot as a function of the sliding direction of the door leaf carrier, so that the control lever is guided in either the first slot or the second slot.

Alternatively, two, differently-shaped track flanks can also be provided in the slot, with which a pin arranged on the control lever can be guided. Here, the pin can touch a different track flank when closing than when opening. The two track flanks can be shaped such that a hysteresis is realized between opening and closing. For this purpose, the opening flank should be less steep than the closing flank, since otherwise the pin may become jammed.

A combination of the examples described above is also conceivable for the implementation of the switching mechanism.

According to one embodiment, the pivot mechanism can comprise several rotation bars, mounted rotatably about their longitudinal axis in the door leaf carrier, and several pivot levers. Each pivot lever can be fixedly connected at its first end to one of the rotation bars and at its second end to one of the door leaves. Such an embodiment of the pivot mechanism is robust and requires only modest design effort.

According to one embodiment, the control lever can be fixedly connected at its first end to a first of the rotation bars and can be mounted at its second end in the slot in an articulated manner. For example, the control lever can be welded, soldered, and/or screwed at its first end to the first rotation bar. In order to simplify disassembly, the control lever and the first rotation bar can also be fixedly connected to one another via a corresponding coupling. As a result, the pivot mechanism can be further simplified.

According to one embodiment, the first door leaf can be connected via at least a first of the pivot levers to the first rotation bar, and via at least a second of the pivot levers to a second of the rotation bars. Additionally or alternatively, the second door leaf can be connected to a third of the rotation bars via at least a third of the pivot levers and to a fourth of the rotation bars via at least a fourth of the pivot levers. The mounting of the door leaves is thus significantly more stable in comparison to a mounting via only one rotation bar and/or only one pivot lever per door leaf.

According to one embodiment, the first rotation bar and the second rotation bar together with the first pivot lever and the second pivot lever can form a first parallelogram guide for pivoting the first door leaf. Additionally or alternatively, the third rotation bar and the fourth rotation bar together with the third pivot lever and the fourth pivot lever can form a second parallelogram guide for pivoting the second door leaf. This makes it possible in an efficient manner for the first or second door leaf to be oriented at a defined angle to the building wall and/or to so remain when the door leaf carrier is being slid. This angle can change slightly as a function of a horizontal position of the door leaf carriers.

According to one embodiment, the first rotation bar can be coupled to the third rotation bar in such a way that a rotational movement of the first rotation bar results in a counter-rotating rotational movement of the third rotation bar. Additionally or alternatively, the second rotation bar can be coupled to the fourth rotation bar in such a way that a rotational movement of the second rotation bar results in a counter-rotating rotational movement of the fourth rotation bar. In other words, the relevant rotation bars can be coupled to one another via a linkage. The linkage can, for example, be a gear or traction linkage, or a combination of both. The linkage can be designed such that the respective rotational movement and the respective counter-rotating rotational movement resulting from the respective rotational movement have the same rotational speed (in terms of magnitude). The rotational movement of the rotation bar driven by the control lever can thus be transmitted to one or more of the remaining rotation bars in an efficient manner.

According to one embodiment, the first rotation bar can be coupled to the second rotation bar in such a way that a rotational movement of the first rotation bar results in a co-rotating rotational movement of the second rotation bar. Additionally or alternatively, the third rotation bar can be coupled to the fourth rotation bar in such a way that a rotational movement of the third rotation bar results in a co-rotating rotational movement of the fourth rotation bar. As a result, it can be achieved with simple means that the first pivot lever be moved together with the second pivot lever and/or the third pivot lever together with the fourth pivot lever. Here, the respective rotational movement and the respective co-rotating rotational movement resulting from the respective rotational movement can have the same rotational speed.

According to one embodiment, the pivot mechanism can comprise at least one spur gear pair for converting the rotational movement into the counter-rotating and/or co-rotating rotational movement. In other words, one or more of the rotation bars can function as shafts of a spur gear transmission. The spur gears of the spur gear pair can, for example, be seated on different rotation bars and thus be connected in a rotationally-fixed manner. The spur gears of the different rotation bars can mesh with each other. The rotational movement of the one rotation bar can thus be converted very easily into a counter-rotating rotational movement of the other rotation bar. The conversion into a co-rotating rotational movement can take place in a similar manner. Such a pivot mechanism can be implemented cost-efficiently, and is space-saving and wear-resistant.

It is possible for the sliding door system to additionally comprise at least one door frame element for at least partial framing of the first door opening and/or second door opening. The door frame element can have a lip seal for sealing the respective door opening. The lip seal can be positioned such that it is compressed with a defined force by an outer edge section of the respective door leaf when the respective door opening is closed by the respective door leaf.

Embodiments of the invention will be described below with reference to the accompanying drawings, wherein neither the drawings nor the description are intended to be interpreted as limiting the invention.

The drawings are merely schematic, and not to scale. In the different figures, identical reference signs denote identical or similar features.

DETAILED DESCRIPTION

Figure 1:
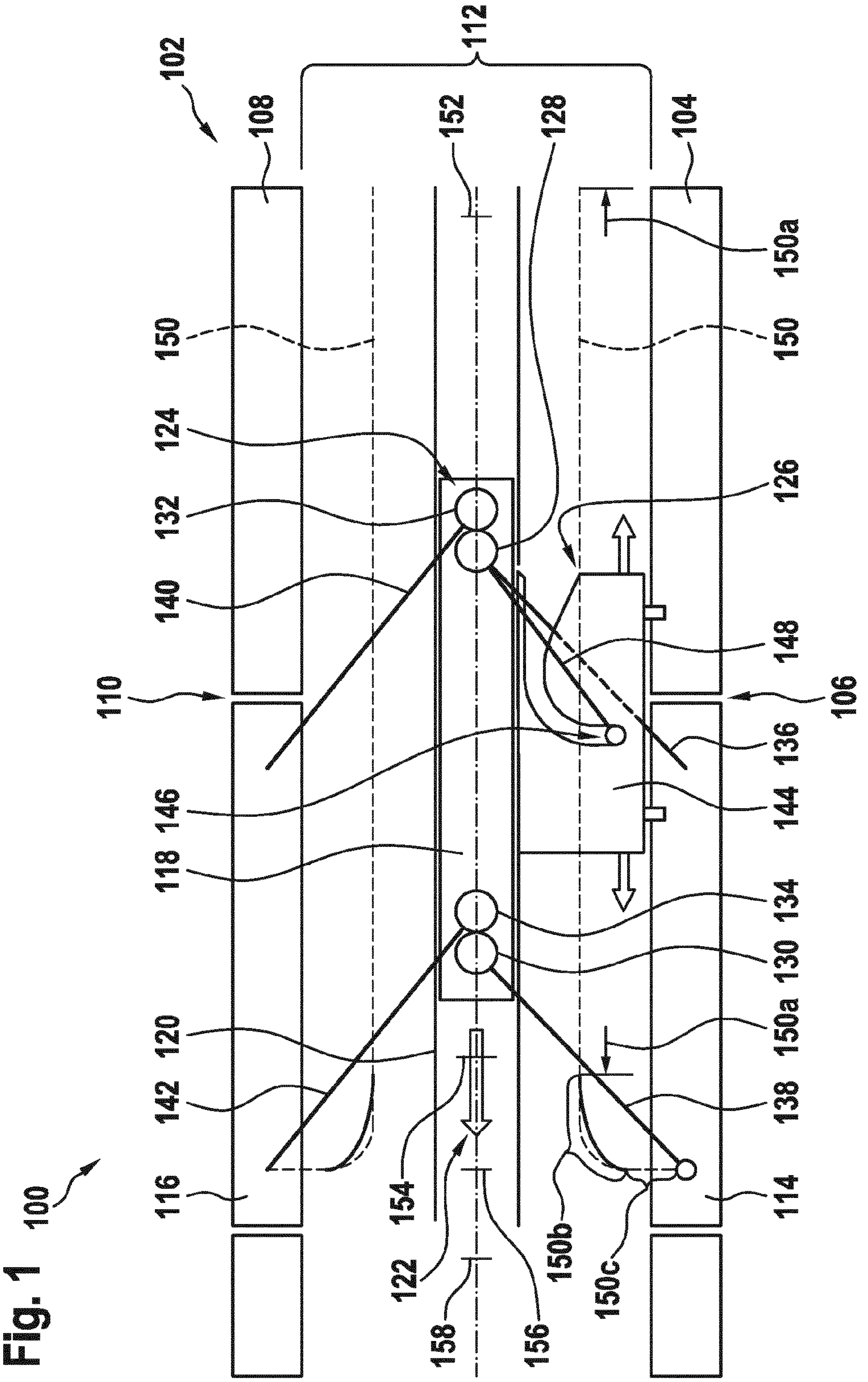
FIG. 1 shows a plan view of a sliding door system according to an exemplary embodiment of the invention in the installed state.

FIG. 1 shows a sliding door system 100 installed in a building wall 102. The sliding door system 100 comprises a first wall part 104 with a first door opening 106 and a second wall part 108 with a second door opening 110—for example, in the form of wall panels or wall frameworks or a combination of both.

The two wall parts 104, 108 are arranged opposite one another so that the first door opening 106 is opposite the second door opening 110, which together form a passage through the building wall 102. In addition, the two wall parts 104, 108 are separated from one another by an intermediate space 112, which is dimensioned such that it provides sufficient space for the installation of components of the sliding door system 100.

The sliding door system 100 comprises a first door leaf 114 for closing the first door opening 106 and a second door leaf 116 for closing the second door opening 110. FIG. 1 shows the sliding door system 100 in a closed state in which both door openings 106, 110 are closed by the respective door leaf 114 or 116.

The two door leaves 114, 116 are pivotably mounted on a door leaf carrier 118, which is mounted slidably along the intermediate space 112 in a horizontal sliding direction 122 by means of a linear guide device 120—for example, in the form of a roller guide or sliding guide. The door leaf carrier 118 can be arranged at least partially between the wall parts 104, 108.

The door leaf carrier 118 can be slidable—for example, by means of an electric drive (not shown).

To be able to pivot the door leaves 114, 116 into or out of the respective door opening 114 or 116 in a controlled manner as a function of a sliding movement of the door leaf carrier 118, taking into account a given assembly space, the sliding door system 100 further comprises a pivot mechanism 124 for changing a respective position and/or orientation of the door leaves 114, 116 relative to the door leaf carrier 118 and also a coupling device 126 for driving the pivot mechanism 124 as a function of the sliding movement.

In this example, the pivot mechanism 124 comprises a first rotation bar 128, a second rotation bar 130, a third rotation bar 132, and a fourth rotation bar 134. The rotation bars 128, 130, 132, 134 are each mounted in the door leaf carrier 118 rotatably about their vertical longitudinal axis.

The first door leaf 114 is connected in an articulated manner to the first rotation bar 128 via a first pivot lever 136 and to the second rotation bar 130 via a second pivot lever 138, which together form a first parallelogram guide for guiding the first door leaf 114.

In an analogous manner, the second door leaf 116 is connected to the third rotation bar 132 via a third pivot lever 140 and to the fourth rotation bar 134 via a fourth pivot lever 142, which together form a second parallelogram guide for guiding the second door leaf 116.

Each of the pivot levers 136, 138, 140, 142 can be fixedly connected at its first end to the respective rotation bar and at its second end to the respective door leaf.

The coupling device 126 comprises a slotted component 144 with a slot 146 which can be realized as a groove or recess in the slotted component 144. Here, the slotted component 144 is fixedly mounted outside the door leaf carrier 118 on an inner side, facing the intermediate space 112, of the first wall part 104 and above the first door opening 106 or the first door leaf 114. However, other mounting locations for the slotted component 144, e.g., a building floor or a building ceiling, are also possible.

The slotted component 144 can be mounted in such a way that it can be slid slightly in the horizontal direction for adjustment purposes (indicated by two arrows).

In order to couple the slotted component 144 to the pivot mechanism 124, in this example, a control lever 148 is guided at its first end in the slot 146, e.g., via a guide pin mounted therein, and is connected at its second end in a rotationally-fixed manner to the first rotation bar 128. In this way, the horizontal sliding movement of the door leaf carrier 118 can, in accordance with the course of the slot 146, be converted into a rotational movement of the first rotation bar 128, whereby the first door leaf 114 is pivoted towards or away from the door leaf carrier 118.

In order to pivot the second door leaf 116 towards or away from the door leaf carrier 118 synchronously with the first door leaf 114, the first rotation bar 128 can be coupled to the third rotation bar 132 via a simple linkage, e.g., in the form of a spur gear pair, such that the rotational movement of the first rotation bar 128 results in a corresponding counter-rotating rotational movement of the third rotation bar 132.

The second rotation bar 130 and the fourth rotation bar 134 can be coupled to one another in a similar manner.

In addition, the first rotation bar 128 can similarly be coupled to the second rotation bar 130, and/or the third rotation bar 132 to the fourth rotation bar 134. In this case, the coupling can be such that the rotational movement of the one rotation bar results in a co-rotating rotational movement of the other rotation bar.

The slot 146 can be adapted in its course such that one or more of the following criteria are fulfilled:

- Rapid opening and/or gentle closing of the door leaves 114, 116 is made possible.
- The forces that act upon the door leaves 114, 116 and/or the slot 146 during rapid opening are minimal.
- The movements of the door leaves 114, 116 during opening and closing are almost jerk-free.
- The door leaves 114, 116 do not touch the building wall 102 at any time during their movement.
- A gap between the door leaves 114, 116 and the respective wall part 104 or 108 in the closed state does not exceed an allowable maximum width, in order to minimize the risk of injury due to clamping.

For example, the geometry of the slot 146 can be selected as a function of a given building wall such that the door leaves 114, 116 describe a specific movement path 150 during opening and/or closing, which movement path can be characterized by a straight first track section 150*a*, a curved second track section 150*b*, and a straight third track section 150*c*.

As shown by way of example in FIG. 1, the first track section 150*a* can be oriented to be substantially parallel to the sliding direction 122 and/or substantially perpendicular to the third track section 150*c*.

For example, the door leaves 114, 116 follow the first track section 150*a* when the door leaf carrier 118 is slid between an initial position 152 in which the two door openings 106, 110 are open and a first intermediate position 154, the second track section 150*b* when the door leaf carrier 118 is slid between the first intermediate position 154 and a second intermediate position 156 in which the first door leaf 114 of the first door opening 106 and the second door leaf 116 of the second door opening 110 are opposite, and the third track section 150*c* when the door leaf carrier 118 is slid between the second intermediate position 156 and an end position 158 in which the first door leaf 114 is pivoted into the first door opening 106 and the second door leaf 116 is pivoted into the second door opening 110.

In order to ensure as jerk-free a pivoting of the door leaves 114, 116 as possible, the second track section 150*b* can run at least partially in the shape of a clothoid.

In addition, it is possible for the curvature of the second track section 150*b* to vary in its curvature as a function of the direction in which the door leaf carrier 118 is slid as shown by the solid line and dashed line second track sections in FIG. 1. For example, the slot 146 can be adapted such that opening takes place more rapidly than closing. For this purpose, the coupling device 126 can comprise a switching mechanism (not shown), which can be actuated by means of the control lever 148 as a function of the sliding direction 122, for switching between a first geometry and a second geometry of the slot 146.

Figure 2:
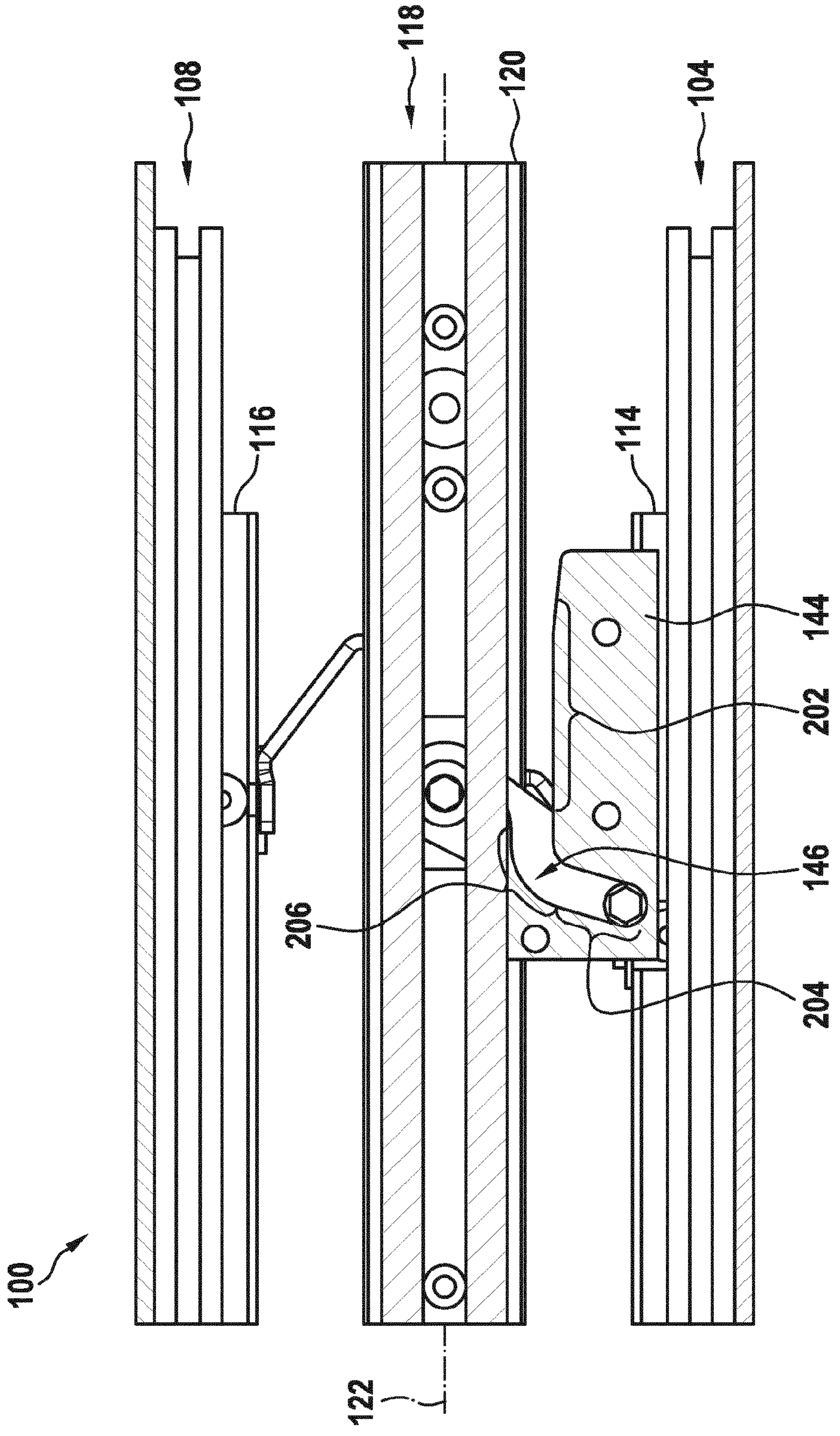
FIG. 2 shows a section of the guide rail system from FIG. 1 in the closed state.
Figure 3:
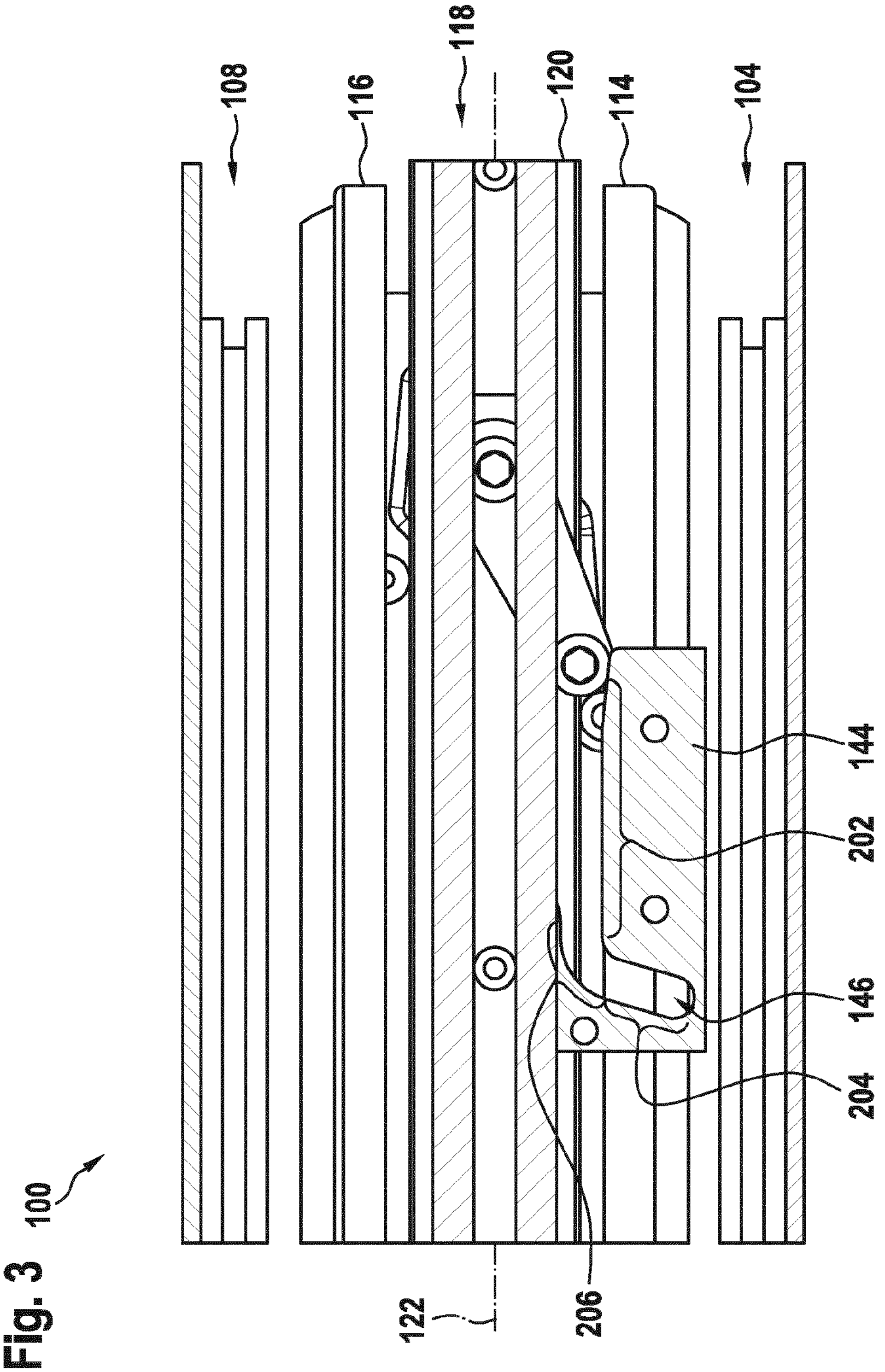
FIG. 3 shows a section of the guide rail system from FIG. 1 in the open state.
Figure 4:
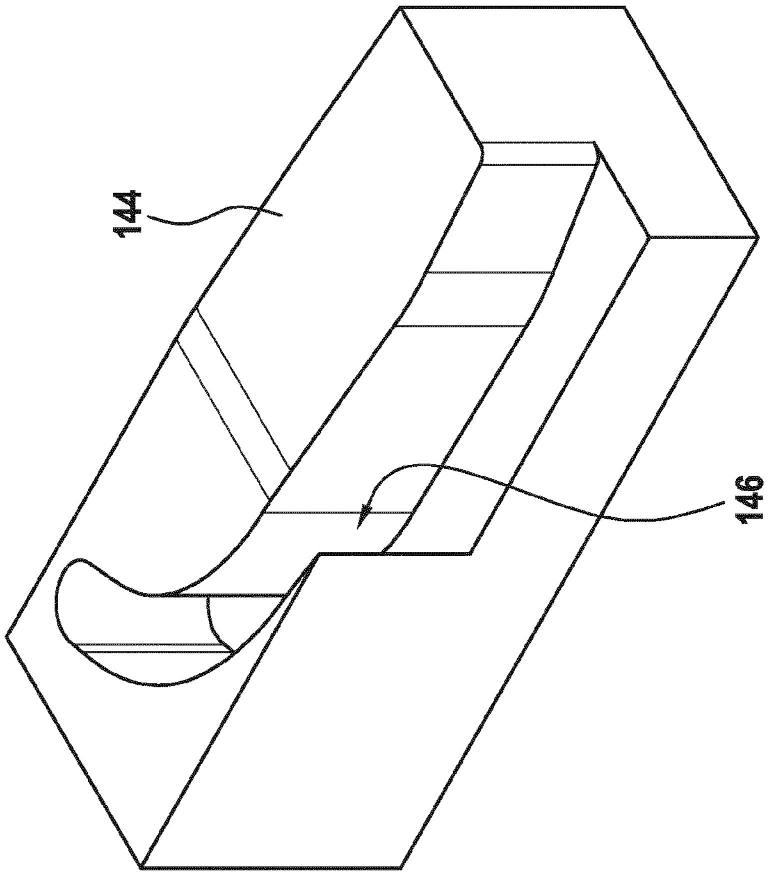
FIG. 4 shows a perspectival view of a slotted component according to one exemplary embodiment of the invention.

A particularly advantageous geometry of the slot 146, by means of which the aforementioned effects can be generated, is shown in FIG. 2, FIG. 3, and FIG. 4.

As shown in FIG. 2 and FIG. 3, the slot 146 can be divided into a straight first slot section 202 extending substantially parallel to the sliding direction 122, a straight second slot section 204 extending obliquely to the first slot section 202, as well as a curved or arcuate third slot section 206 forming a transition between the first slot section 202 and the second slot section 204.

FIG. 4 shows the slotted component 144 in an enlarged representation. In this example, the slotted component 144 is realized as a milled part with a milled-in slot 146.

It is noted that, on the same day as the present patent application, WO 2022/243039 A1 (EP 21173993.3), the applicant has filed two further patent applications which also relate to sliding doors. Embodiments of the sliding doors and their function elements described therein can optionally also be used in the same or similar manner in embodiments of the invention described herein. The content of the two further patent applications, WO 2022/243091 A1 (EP 21173992.5) and WO 2022/243037 A1 (EP 21173990.9), is incorporated herein in its entirety by reference.

Finally, it should be noted that terms such as "comprising," "including," etc., do not exclude other elements or steps, and terms such as "a" or "one" do not exclude a plurality. Furthermore, it should be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A sliding door system for installation in a building wall, the sliding door system comprising:

a first wall part having a first door opening formed therein;

a second wall part having a second door opening formed therein, wherein the first wall part and the second wall part are arranged opposite of one another such that the first door opening is opposite the second door opening and the first wall part is separated from the second wall part by an intermediate space;

a first door leaf for closing the first door opening;

a second door leaf for closing the second door opening;

a door leaf carrier slidable in a sliding direction along the intermediate space by a linear guide device and on which the first door leaf and the second door leaf are pivotably mounted by a pivot mechanism; and a coupling device adapted to convert a sliding movement of the door leaf carrier into a rotational movement of the pivot mechanism such that the first door leaf and the second door leaf are pivoted relative to the door leaf carrier by the rotational movement, wherein the coupling device includes a slotted component having a slot formed therein, and the coupling device includes a control lever coupling the slotted component to the pivot mechanism, wherein the slotted component is mounted on the first wall part;

wherein the pivot mechanism includes four rotation bars, each of the rotation bars being rotatably mounted about a longitudinal axis thereof in the door leaf carrier, each of the longitudinal axes being offset in the sliding direction from each other of the longitudinal axes, and four pivot levers, wherein each of the pivot levers is fixedly connected at a first end to an associated one of the rotation bars and at a second end articulatedly mounted to an associated one of the first and second door leaves; and wherein the control lever is fixedly connected at a first end to a first of the torsion rotation bars and is articulatedly mounted at a second end in the slot.

2. The sliding door system according to claim 1 wherein the slot has a straight first slot section, a straight second slot section, and a curved third slot section for guiding the control lever, wherein the third slot section is arranged between the first slot section and the second slot section and/or transitions into the first slot section and the second slot section.

3. The sliding door system according to claim 2 wherein the first slot section and the second slot section are oriented obliquely to each other.

4. The sliding door system according to claim 2 wherein the slotted component is mounted on the first wall part such that the first slot section extends parallel to the sliding direction of the door leaf carrier.

5. The sliding door system according to claim 1 wherein a geometry of the slot includes a straight first slot section, a straight second slot section and a curved third slot section that direct the first door leaf and the second door leaf each to:

follow a first track section when the door leaf carrier slides between an initial position, in which the first door opening and the second door opening are open, and a first intermediate position;

follow a second track section when the door leaf carrier slides between the first intermediate position and a second intermediate position in which the first door leaf is opposite the first door opening and the second door leaf is opposite the second door opening; and follow a third track section, that is orthogonal to the first track section, when the door leaf carrier slides between the second intermediate position and an end position in which the first door leaf closes the first door opening and the second door leaf closes the second door opening.

6. The sliding door system according to claim 5 wherein the third slot section is at least partially clothoid-shaped.

7. The sliding door system according to claim 1 wherein:

the first door leaf is connected to the first rotation bar by at least a first of the pivot levers, and is connected by at least a second of the pivot levers to a second of the rotation bars; and/or the second door leaf is connected by at least a third of the pivot levers to a third of the rotation bars, and is connected by at least a fourth of the pivot levers to a fourth of the rotation bars.

8. The sliding door system according to claim 7 wherein:

the first rotation bar, the second rotation bar, the first pivot lever and the second pivot lever form a first parallelogram guide for pivoting the first door leaf; and/or the third rotation bar, the fourth rotation bar, the third pivot lever and the fourth pivot lever form a second parallelogram guide for pivoting the second door leaf.

9. The sliding door system according to claim 7 wherein:

the first rotation bar is coupled to the third rotation bar such that a rotational movement of the first rotation bar results in a counter-rotating rotational movement of the third rotation bar; and/or the second rotation bar is coupled to the fourth rotation bar such that a rotational movement of the second rotation bar results in a counter-rotating rotational movement of the fourth rotation bar.

10. The sliding door system according to claim 7 wherein:

the first rotation bar is coupled to the second rotation bar such that a rotational movement of the first rotation bar results in a co-rotating movement of the second rotation bar; and/or the third rotation bar is coupled to the fourth rotation bar such that a rotational movement of the third rotation bar results in a co-rotating movement of the fourth rotation bar.

11. A sliding door system for installation in a building wall, the sliding door system comprising:

a first wall part having a first door opening formed therein;

a second wall part having a second door opening formed therein, wherein the first wall part and the second wall part are arranged opposite of one another such that the first door opening is opposite the second door opening and the first wall part is separated from the second wall part by an intermediate space;

a first door leaf for closing the first door opening;

a second door leaf for closing the second door opening;

a door leaf carrier slidable in a sliding direction along the intermediate space by a linear guide device and on which the first door leaf and the second door leaf are pivotably mounted by a pivot mechanism;

a coupling device adapted to convert a sliding movement of the door leaf carrier into a rotational movement of the pivot mechanism such that the first door leaf and the second door leaf are pivoted relative to the door leaf carrier by the rotational movement, wherein the coupling device includes a slotted component having a slot formed therein, and the coupling device includes a control lever coupling the slotted component to the pivot mechanism, wherein the slotted component is mounted on the first wall part;

wherein the pivot mechanism includes first, second, third and fourth rotation bars, each of the rotation bars being rotatably mounted about a longitudinal axis thereof in the door leaf carrier, each of the longitudinal axes being offset in the sliding direction from each other of the longitudinal axes, and first, second, third and fourth pivot levers;

wherein the control lever is fixedly connected at a first end to the first rotation bar and is articulatedly mounted at a second end in the slot;

wherein the first door leaf is connected to the first rotation bar by the first pivot lever and is connected to the second rotation bar by the second pivot lever; and wherein the second door leaf is connected to the third rotation bar by the third pivot lever and is connected to the fourth rotation bar by the fourth pivot lever.

* * * * *